United States Patent [19]
Collins et al.

[11] Patent Number: 6,134,905
[45] Date of Patent: Oct. 24, 2000

[54] EVAPORATIVE COOLER PUMP APPARATUS

[76] Inventors: Harold O. Collins, 7551 E. North La., Scottsdale, Ariz. 85258; James J. Hennessy, 3622 W. Pecan Rd., Phoenix, Ariz. 85041; Gilbert Mancillas, 4320 W. Lewis Ave., Phoenix, Ariz. 85035

[21] Appl. No.: 09/098,616

[22] Filed: Jun. 17, 1998

[51] Int. Cl.$^7$ ...................................................... F28D 5/00
[52] U.S. Cl. ............................ 62/310; 62/121; 417/423.3
[58] Field of Search ............................ 62/310, 304, 121; 417/423.3

[56] References Cited

U.S. PATENT DOCUMENTS

| | | | |
|---|---|---|---|
| 3,666,381 | 5/1972 | Ulm et al. | 417/423 |
| 4,289,713 | 9/1981 | Goettl | 261/27 |
| 4,333,887 | 6/1982 | Goettl | 261/27 |
| 4,468,357 | 8/1984 | Miller et al. | 261/29 |
| 4,479,366 | 10/1984 | Laimer et al. | 62/304 |
| 4,586,877 | 5/1986 | Watanabe et al. | 417/365 |
| 4,752,419 | 6/1988 | Sperr, Jr. et al. | 261/29 |

*Primary Examiner*—William Doerrler
*Assistant Examiner*—Melvin Jones
*Attorney, Agent, or Firm*—H. Gordon Shields

[57] ABSTRACT

Evaporative cooler apparatus includes two pumps, a primary pump which pumps water to an evaporative medium and a secondary pump for pumping water from the bottom of the cooler to drain the cooler. The secondary, or drain pump includes a timer so that it is only on to drain water from the bottom of the cooler for a predetermined time, and after a predetermined number of hours of operation of the primary pump. That is, there is a direct relationship between the operation of the cooler apparatus as evidenced by the primary pump, and the draining of the water at the bottom of the cooler by the secondary, or drain pump. The efficiency of the pumps is increased to allow them to pump with a very low water level without cavitation problems by virtue of an impeller design which includes vanes on the bottom of the impeller disk and vanes on top of an impeller disk. The vanes on top of the impeller disk are disposed radially inwardly from the outer periphery of the outer disk, and the vanes on the bottom of the disk extend radially outwardly from the center portion of the impeller disk. A drain pipe adapter allows a conventional overflow pipe to be used also to drain the water. A conduit from the secondary pump is connected to the drain pipe adapter.

34 Claims, 2 Drawing Sheets

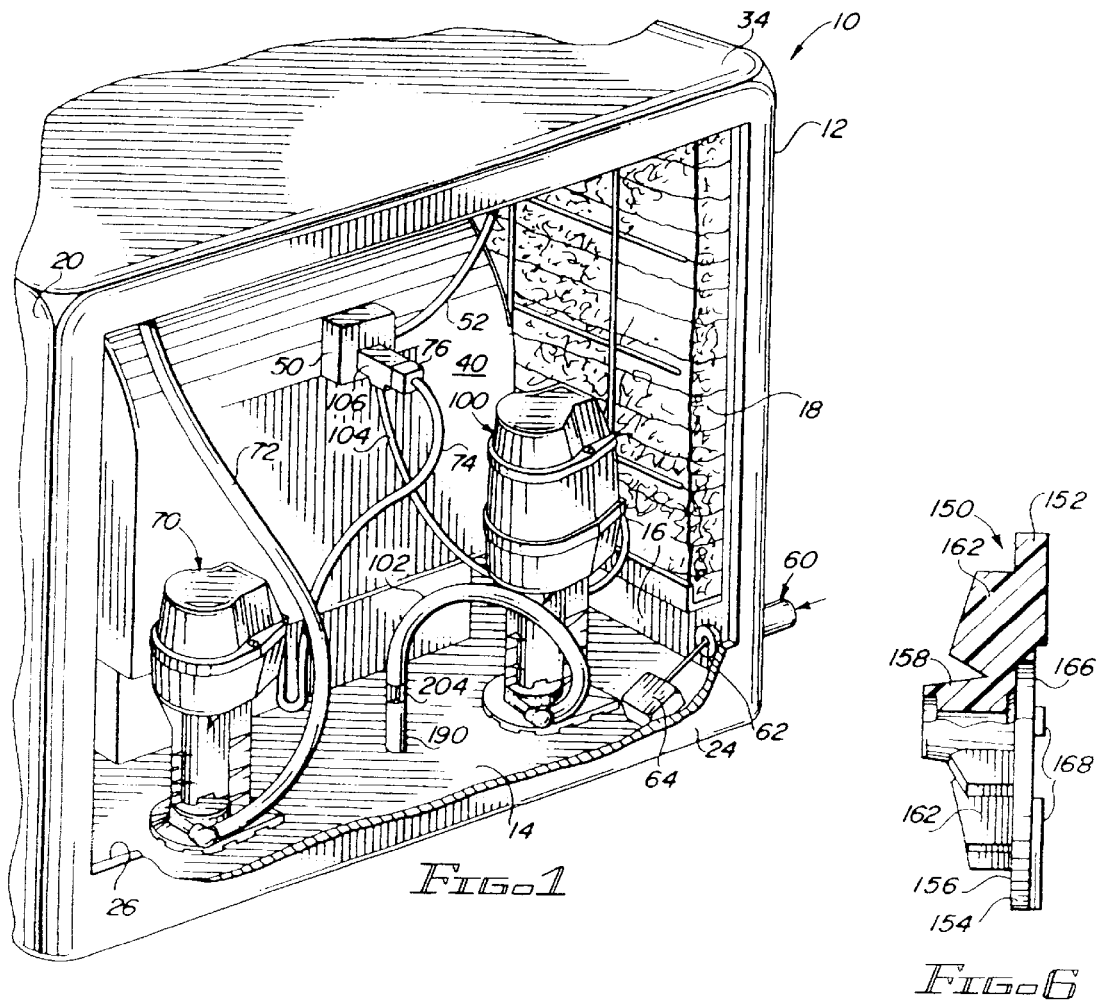
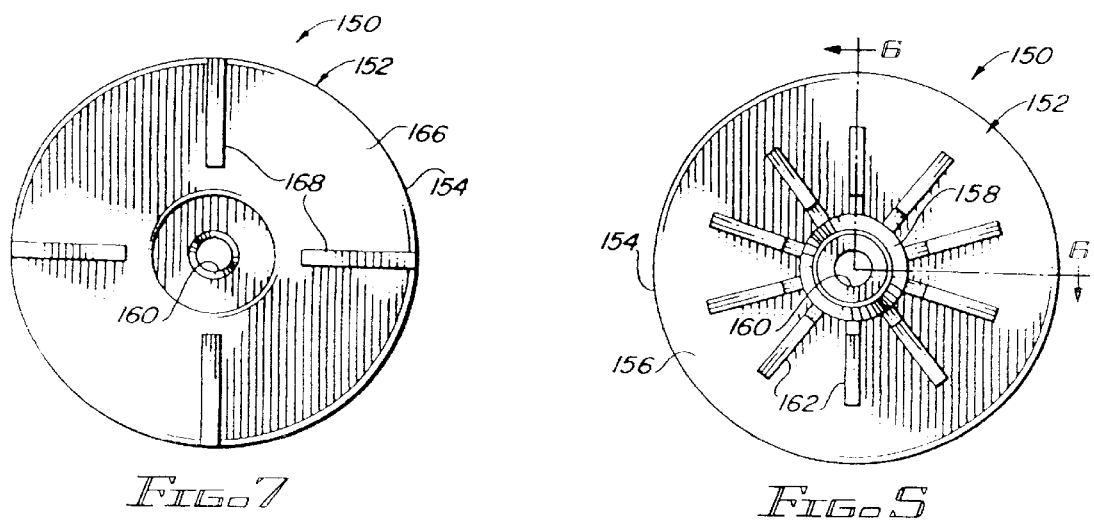

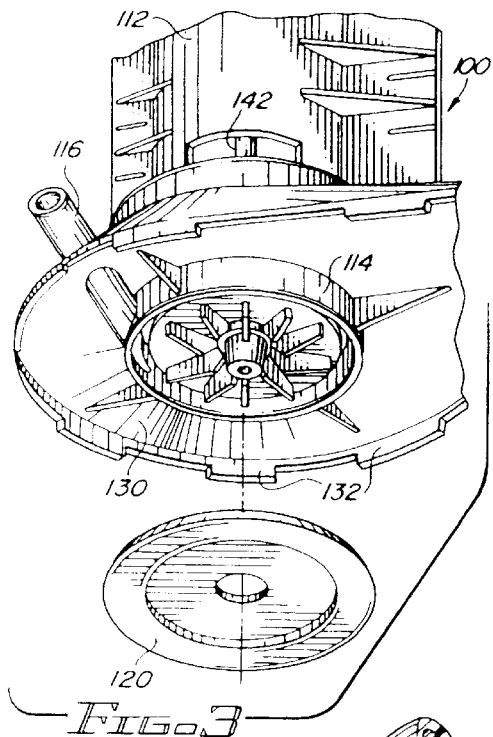
FIG. 3
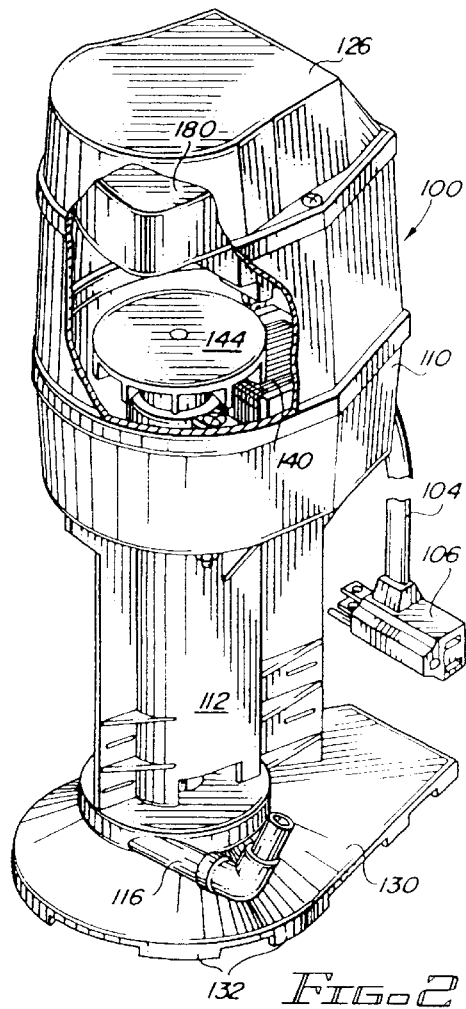
FIG. 2
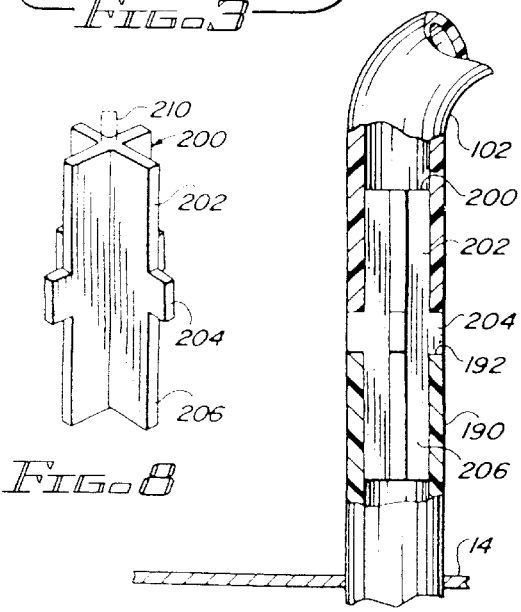
FIG. 8
FIG. 9
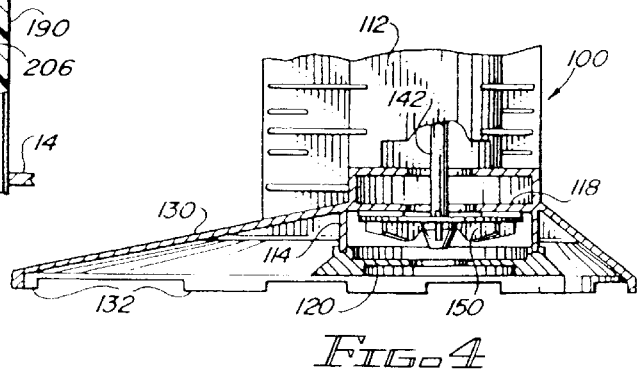
FIG. 4

EVAPORATIVE COOLER PUMP APPARATUS

BACKGROUND OF THE INVENTION

1. Field of the Invention

This relates to evaporative cooler apparatus and, more particularly to a dual pump system for evaporative coolers in which a primary pump is used to supply water to an evaporative medium, and a secondary pump is used to drain the water pan of the evaporative cooler.

2. Description of the Prior Art

Evaporative cooler pumps have been known for many years. Typically, a single pump is used in an evaporative cooler to provide water for soaking an evaporative medium through which air is forced. The air is cooled evaporatively by giving up the latent heat of evaporation to the water in the evaporative medium.

An inherent problem with evaporative cooler pumps of the prior art is their limitation of pumping efficiently when the water level in the pan at the bottom of the evaporative cooler drops below a certain amount, which is typically an inch or so. As the water level decreases, there is cavitation caused by the pump design, namely the impeller of the pump, and the pump loses efficiency. Air is introduced into the stream of pumped water due to impeller cavitation, and the flow rate efficiency of the pump drops substantially.

The evaporative cooler pump of the present invention includes an impeller design which greatly enhances the pumping flow rate efficiency by decreasing the cavitation and accordingly allowing the water level to drop substantially below that which is usable in the prior art pumps, and still pumping efficiently without air bubbles in the pump water line.

A second feature of the pump apparatus of the present invention is the utilization of a secondary pump to periodically drain the evaporative cooler.

To decrease the dissolved solids (or salt) content of water used by evaporative coolers, a bleed system has been utilized by which a portion of the pumped water is continually bled off and drained out of the evaporative cooler. This requires the continual addition of new water to the evaporative cooler on a regular basis to replace the water that has bled off. The introduction of the fresh make-up water decreases the salt concentration content of the water in the cooler sump.

Since some of the water pumped to the evaporative medium drains down and returns to the sump, or bottom, of the evaporative cooler, that water includes the salt originally present in the water, and the build up of salts in the cooler, and on the evaporative medium, causes a loss of efficiency of the evaporative medium and a buildup of the salts in the evaporative cooler housing itself. The continuous bleedoff of the water requires the introduction of fresh water to help decrease the salinity concentration. On the other hand, the continuous bleedoff wastes a substantial amount of water.

A secondary pump, a drain pump, in the evaporative cooler apparatus of the present invention substantially decreases the waste of the water, such as heretofore bled off, by periodically draining the sump or bottom portion of evaporative cooler housing, thus allowing for the introduction of fresh water on a periodic basis. This provides at least two advantages. The first advantage is the use of less water than the prior art continual bleed systems, and a decrease in the salinity of the water due to the replenishment of the water on a regular basis.

A timer is used to actuate the drain pump on a regular basis. The salt or mineral buildup decreases, and the periodic changing of the water prevents a buildup or accumulation of stagnant water, and accordingly, there is a substantially decreased possibility of the breeding of mosquitoes in the evaporative cooler.

SUMMARY OF THE INVENTION

The invention described and claimed herein comprises evaporative cooler apparatus in which a pair of evaporative cooler pumps is connected together. A primary, supply pump is used to provide water for the evaporative medium in the evaporative cooler. A secondary pump is used as a drain pump to periodically drain the water from the bottom of the evaporative cooler. The water is then replenished in the normal manner, such as by means of a float control valve. The pumps include impellers which allow the pumps to function efficiently in water depths as low as about a quarter of an inch or so without appreciable loss in flow rate. The impellers include vanes on both the bottom and the top of an impeller disk. The impeller design substantially increases the efficiency of the pumping process. A drain adapter is utilized to allow a drain pipe in the housing of the cooler apparatus to also be connected to the drain pump.

Among the objects of the present invention are the following:

To provide new and useful evaporative cooler apparatus;

To provide new and useful evaporative cooler pump apparatus;

To provide a pair of pumps in an evaporative cooler;

To provide new and useful evaporative cooler pump apparatus having a high efficiency impeller for pumping in relatively low water level;

To provide a new and useful drain adapter for an evaporative cooler;

To provide evaporative cooler pump apparatus having a primary pump for supplying water to an evaporative medium and a secondary pump for draining the water in the evaporative cooler on a periodic basis; and To provide new and useful high efficiency evaporative cooler apparatus utilizing two pumps.

BRIEF DESCRIPTION OF THE DRAWING

FIG. 1 is a perspective view of evaporative cooler pumps of the present invention in their use environment.

FIG. 2 is a perspective view of a drain pump of the present invention.

FIG. 3 is an exploded perspective view of a portion of the apparatus of the present invention.

FIG. 4 is a side view in partial section of a portion of the apparatus of the present invention.

FIG. 5 is a bottom plan view of a portion of the apparatus of the present invention.

FIG. 6 is a view in partial section taken generally along line 6—6 of FIG. 5.

FIG. 7 is a top plan view of the apparatus of FIG. 5.

FIG. 8 is a perspective view of a portion of the apparatus of the present invention.

FIG. 9 is a side view in partial section illustrating the apparatus of FIG. 8 in its use environment.

DESCRIPTION OF THE PREFERRED EMBODIMENT

FIG. 1 is a perspective view of evaporative cooler apparatus 10, which comprises the use environment of evaporative cooler pump apparatus 70 and 100 of the present invention. The pumps 70 and 100 are shown disposed within an evaporative cooler housing 12, and on a bottom wall 14 thereof The housing 12 also includes a pair of side walls 16 and 20, a back wall 24, and a front wall, not shown, and a top wall 34. The side walls 16 and 20 both include openings, and appropriate panels are disposed in the openings, and evaporative medium is in turn secured to panels in the openings. In FIG. 1, the evaporative medium 18 is shown disposed within the opening of the side wall 16. An opening 26 is shown extending through the back wall 24. The opening 26 may likewise include an appropriate panel for holding an evaporative medium.

Within the housing 12 is a blower housing 40. A blower disposed within the housing 40 provides the air flow into the interior of the housing 12 through the evaporative medium pads and into the structure to which the evaporative cooler apparatus 10 is secured.

An electric outlet 50 is shown secured to the blower housing 40. A conductor 52 extends from the outlet 50 outwardly, as is well known and understood in the art.

A water input conduit 60 is shown extending to the side wall 16. The conduit 60 is appropriately connected to a valve 62. The valve 62 is controlled by a float 64. As the water level within the bottom of the housing 12 decreases, the float 64 opens the valve 62 to replenish the water supply. Such is well known and understood.

Two pumps, a primary or supply pump 70, and a secondary or drain pump 100, are shown disposed on the bottom wall 14 of the housing 12. A water conduit 72 extends from the pump 70 upwardly to a water distribution manifold or spider which in turn carries the water to the evaporative medium pads.

The secondary or drain pump 100 is connected to a drain conduit 102. The conduit 102 extends to an overflow pipe 190 which is appropriately secured to and extends through the bottom wall 14 to allow the water pumped by the pump 100 to drain from the housing 12.

An electrical cord 104 extends to a combination plug and receptacle 106. The plug portion of the plug receptacle 106 is appropriately connected to the outlet 50. The cord 74 and its plug 76 are in turn connected to the receptacle portion of the plug receptacle 106. The two pumps 70 and 100 accordingly require only a single outlet or receptacle for their operation.

The pumps 70 and 100 are similar to each other. The primary difference between them is a timer unit 180 in the pump 100. This will be discussed in detail below.

FIG. 2 is a perspective view, partially broken away, of the pump 100 illustrating its electrical elements, including a timer 180. The conduit 102 (see FIGS. 1 and 9) extends from an outlet 116 of the pump 100 to a drain pipe 190 for draining water from the bottom of the cooler housing 12, as discussed above and as will be discussed in detail below.

Details of the pump 100 are illustrated in FIGS. 2, 3, and 4. FIG. 3 is a bottom perspective view of the pump apparatus 100 particularly illustrating features of a pump impeller associated with both the pump apparatus 70 and 100. FIG. 4 is a side view in partial section of the lower portion of the pump apparatus 100, specifically illustrating the impeller portion of the pump. For the following discussion, reference will primarily be made to FIGS. 2, 3, and 4.

The pump apparatus 100 includes a motor housing 110 in which is disposed an electrical motor 140. Beneath the motor housing 110 is a shaft housing 112. A motor shaft 142 extends from the motor 140 downwardly through the shaft housing 112 to an impeller 150. Beneath the shaft housing 112 is an impeller housing 114. The shaft 142 extends into the impeller housing 114. The impeller 150 is secured to the bottom of the shaft 142 within the housing 114.

Above the motor 140, and secured to the upper portion of the shaft 142, is a fan 144. The fan 144 provides a cooling flow of air for the motor 140 and the timer 180.

The motor housing 10 is closed by a cap 126.

At the bottom of the shaft housing 112 is a base 130. The base 130 extends outwardly to provide a relatively sturdy base support for the motor housing 110, the shaft housing 112, and the various elements associated with the apparatus. Extending downwardly from the base 130 is a plurality of feet 132. The feet 132 are spaced apart to allow water to flow between the feet and within the base 130 and to the impeller housing 114.

An outlet 116 extends from the impeller housing 114. The drain conduit 102 is connected to the outlet 116. From the outlet 116, the conduit 102 extends to a drain hose adapter 200. The adapter 200 will be discussed in detail below in conjunction with FIGS. 8 and 9.

The impeller housing 114 comprises a generally relatively short cylinder in which is disposed the impeller 150. The housing 114 includes an apertured top wall 118 and an apertured bottom plate 120. Water flows into the impeller housing 114 through the apertured bottom plate 120.

Details of the impeller 150 are shown in FIGS. 5, 6, and 7, in addition to FIGS. 3 and 4.

FIG. 5 is a plan view of the bottom of the impeller 150. FIG. 6 is a view in partial section of the impeller 150 taken generally along line 6—6 of FIG. 5. FIG. 7 is a plan view of the top of the impeller 150. For the following discussion of the impeller 150, reference will primarily be made to FIGS. 5, 6, and 7, in addition to FIGS. 3 and 4.

The impeller 150 comprises a relatively thin and generally circular disk 152. The disk 152 includes an outer periphery 154. The disk 152 also includes a bottom surface 156 and a top surface 166.

Disposed about the center of the disk 152, and extending outwardly from the bottom surface of the disk 152 is a shaft boss 158. A bore 160 extend through the shaft boss 158. The bore 160 receives the shaft 142 of the motor 140, as best shown in FIGS. 3 and 4.

Extending radially outwardly from the shaft boss 158 at the center of the disk 152 is a plurality of vanes 162. As illustrated in FIG. 5, the vanes 162 are spaced apart equally a relatively few degrees, in comparison with contemporary pump impellers. Ten vanes 162 are shown in FIG. 5 spaced apart equally from each other. The distal tips or outer ends of the vanes 162 terminate inwardly from the outer periphery 154 of the disk 152.

The configuration of the vanes 162 is best shown in FIG. 6. The "upper" or "outer" surface of each vane 162 is farthest from the bottom surface 156 adjacent to the boss 158 and are closest to the surface 156 remote from the boss 158. In other words, the "height" of the vanes 162 tapers generally toward the surface 156 outwardly from the center portion of the disk 152.

On the top surface 166 are shown four vanes 168. The vanes 168 extend upwardly a relatively short distance from the top surface 166, and they extend radially inwardly from the outer periphery 154 of the disk 152. The vanes 168 terminate radially outwardly from the center portion of the disk 152. Moreover, as best shown in FIG. 7, the configuration of the vanes 168 is generally rectangular.

The vanes 168 on the top 166 of the impeller 150 help to prevent water from being pushed up through the aperture in top wall 118 of the impeller housing 114.

The disk 152 helps to prevent cavitation and accordingly allows the pump apparatus 100 to efficiently pump in water down to a depth of about a quarter of an inch or so.

Returning again to FIG. 2, within the cap 126, and disposed above the motor 140, is the timer 180. The timer 180 works in conjunction with the pump 70 so that after a predetermined cumulative time period of the "on" operation of the primary pump 70, the timer 180 causes the motor 140 to turn on, thus pumping the water from the bottom of the evaporative cooler housing 12 upwardly from the housing. The timer 180 is preset so that it operates for a predetermined number of minutes before turning off.

For example, for every twelve hours of cumulative operation of the pump 70, the timer 180 will cause the pump 100 to operate for a short period of time, such as seven minutes. During the seven minute time period that the pump 100 operates, the water in the bottom of the housing 12 is effectively drained down to a minimum amount in the bottom of the cooler apparatus 10. At the same time, the demand for the water in the cooler apparatus 10 caused by the float 64 and the valve 62, causes fresh water to flow into the housing 12. The fresh water replenishes the water supply, and thus fresh water substantially completely flows into the housing 12 on a periodic basis.

It is obvious that when the water is pumped from the housing 12 by the pump apparatus 100, the float 64 will cause fresh water to come in, thus diluting the old water that is pumped out. This insures that most of the old water is indeed pumped out and fresh water is brought into the housing 12.

FIG. 8 is a perspective side view of a drain adapter 200 useable with the drain pump 100 and the evaporative cooler apparatus 10 and particularly with the bottom 14 of the housing 12. As is well known and understood. FIG. 9 is a side view in partial section showing the adapter 200 secured to the overflow and drain pipe 190 and to the conduit 102. For the following discussion, reference will primarily be made to FIGS. 1, 8, and 9.

As indicated above, the overflow and drain pipe 190 is appropriately secured to and extends through the bottom 14 of the housing 12. In prior art evaporative coolers, an overflow pipe serves as a safety feature for draining overflow water out of a cooler housing. In the apparatus of the present invention, the pipe 190 also serves as a drain pipe when the drain pump 100 is "on" for draining the housing 12.

To allow both functions to be accomplished by the pipe 190, the drain adapter 200 is used to connect the conduit 102 to the pipe 190. The adapter 200 is "open" so that overflow water may drain through the pipe 190. Water pumped through the conduit 102 flows downwardly along the adapter 200 to the pipe 190.

The adapter 200 comprises an elongated "X" configured or cross-shaped element, with outwardly extending tabs 204 centrally located along the length of the element. The element 200 includes four elongated arms. Phrased in another manner, two arm portions preferably bisect each other at right angles, defining a four armed element. The arms extend outwardly from a central longitudinal axis of the adapter.

The width or effective diameter of the element 200 above and below the tabs 204 is essentially the same as the inner diameter of the drain pipe 190 and as the inner diameter of the conduit 102. As shown in FIG. 10, the inner diameters of the pipe 190 and the conduit 102 are the same.

The tabs 204 extend outwardly from the arm of the element 200. The outwardly extending tabs 204 have a greater width or diameter, which width or diameter is preferably at least the same as the outer diameter of the pipe 190 to allow the adapter 200 to be comfortably disposed in and on the pipe 190.

The "height" of the tabs 204 is sufficient to allow overflow water to flow into the pipe 190 between a top rim 192 of the pipe 190 and the bottom of the conduit 102 without problems of air flow or surface tension. Overflow water from the bottom of the housing 12 flows into the pipe 190 between the outwardly extending tabs 204 and the arms of the adapter element 200. The tabs 204 are simply extensions of the arms which comprise the element 200.

The tabs 204 essentially divide the arms of the adapter 200 into two portions, an upper portion 202 and a lower portion 206.

As shown in FIG. 9, the bottoms of the tabs 204 are disposed on the top rim 192 of the pipe 190. The upper arm portion 202 of the adapter 200 extends upwardly into the conduit 102, and the bottom arm portion 206 extends downwardly into the pipe 190 from the tabs 204.

An alternate embodiment of the adapter 200 is also illustrated in FIG. 8. In dash dot line is shown an arm 210. The use of the arm 210, with two of the four arms shown for the apparatus 200, comprises a three armed adapter. Preferably, the arms of the adapters are spaced apart from each other equal arcuate distances. The arms of the three armed embodiment are disposed apart an equal arcuate distance, providing a one hundred twenty degree separation, as opposed to a ninety degree separation for the arms of the four armed adapter 200.

In the three armed adapter, each arm has the same configuration as the arms illustrated for the four armed adapter 200, with tabs extending outwardly from the arms to be disposed on the top rim of the drain or overflow pipe. The three arms extend outwardly from a central longitudinal axis.

The evaporative cooler apparatus 10 shown in FIG. 1 is illustrated as being generally rectangular or square, but it will be understood that other configurations, such as round, may also be used.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What we claim is:

1. Evaporative cooler pump apparatus comprising in combination:

a shaft;

motor means connected to the shaft for rotating the shaft;

impeller means secured to the shaft remote from the motor means for pumping water, including
     a disk having a top side, a bottom side, a central portion, and an outer rim,
     a first plurality of vanes secured to the bottom side of the disk and extending radially outwardly from the central portion and terminating inwardly from the outer rim, and a second plurality of vanes secured to the top side of the disk and extending radially inwardly from the outer rim; and housing means for enclosing the motor means and the impeller means.

2. The apparatus of claim 1 in which the housing means includes an impeller housing in which the impeller is disposed.

3. The apparatus of claim 2 in which the first plurality of vanes is numerically greater than the second plurality of vanes.

4. The apparatus of claim 2 in which the motor means includes a motor and a timer for periodically actuating the motor to pump water.

5. Evaporative cooler apparatus comprising in combination:

evaporative cooler housing means, including
a bottom wall,
side wall means extending upwardly from the bottom wall,
a top wall secured to the side wall means, and
an evaporative medium secured to the side wall means;

means for providing water to the evaporative cooler housing means;

a drain pipe for draining water from the evaporative cooler housing means;

first pump means operative for pumping water for the evaporative medium;

second pump means operative for pumping water to drain the evaporative cooler housing means, including a drain pump and timer means responsive to the cumulative time of operation of the first pump means for controlling the operation of the drain pump to drain the evaporative cooler housing means after a predetermined number of hours of operation of the first pump means; and drain pipe adapter means connected to the drain pipe and to the second pump means for allowing the drain pump to receive overflow water from the evaporative cooler housing means and water from the drain pump of the second pump means.

6. The apparatus of claim 5 in which the drain pipe adapter means comprise a pair of arms and tabs extending outwardly from the pair of arms.

7. The apparatus of claim 6 in which the tabs divide the pair of arms into an upper portion and a lower portion.

8. The apparatus of claim 6 in which the drain pipe is secured to and extends through the bottom wall.

9. The apparatus of claim 8 in which the drain pipe includes a drain pipe having a top rim and the tabs of the drain pipe adapter means are disposed on the top rim.

10. The apparatus of claim 9 in which the second pump means includes a drain pump and a conduit extending from the drain pump to the drain pipe adapter means through which water pumped by the second pump flows to the drain pipe adapter and to the drain pipe.

11. The apparatus of claim 6 in which the pair of arms bisect each other.

12. The apparatus of claim 5 in which the first pump means includes a motor, a shaft connected to and rotated by the motor, and an impeller secured to the shaft for pumping water.

13. The apparatus of claim 12 in which the impeller of the first pump means includes a disk having a central hub, a top side, a bottom side, and an outer periphery, a first plurality of vanes secured to the top side and extending radially inwardly from the outer periphery, and a second plurality of vanes secured to the bottom side and extending radially outwardly from the central hub.

14. The apparatus of claim 5 which further includes means for providing electrical power for the first pump means and the second pump means.

15. The apparatus of claim 14 in which the means for providing electrical power includes
an electrical outlet,
a combination outlet plug connected to the electrical outlet and to one of the first pump means and the second pump means and a plug connected to the outlet of the combination plug and outlet and to the other of the first pump means and second pump means.

16. A drain pipe adapter for an evaporative cooler comprising:

a plurality of arms extending outwardly from a longitudinal axis; and tabs extending outwardly from the arms for dividing the arms into an upper portion and a lower portion, with the tabs to be disposed on the drain pipe.

17. The apparatus of claim 16 in which the plurality of arms comprises four arms.

18. The apparatus of claim 16 in which the plurality of arms comprises three arms.

19. The apparatus of claim 16 in which the arms of the plurality of arms are spaced apart from each other equal arcuate distances.

20. The apparatus of claim 16 in which the plurality of arms extends outwardly from a center longitudinal axis.

21. Evaporative cooler apparatus comprising in combination:

evaporative cooler housing means, including
a bottom wall,
a side wall means extending upwardly from the bottom wall,
a top wall secured to the side wall means, and
an evaporative medium secured to the side wall means;

means for providing water to the evaporative cooler housing means;

a drain pipe for draining water from the evaporative cooler housing means;

first pump means operative for pumping water for the evaporative medium; and second pump means operative for pumping water to drain the evaporative cooler housing means, including a drain pump and timer means responsive to the cumulative time of operation of the first pump means for controlling the operation of the drain pump to drain the evaporative cooler housing means after a predetermined number of hours of operation of the first pump means.

22. The apparatus of claim 21 which further includes a conduit extending from the drain pump to the drain pipe.

23. The apparatus of claim 22 which further includes an adapter between the conduit and the drain pipe.

24. In an evaporative cooler, the improvement comprising:

a drain pump operative at a low depth to pump accumulated water from the evaporative cooler, a timer connected to the drain pump to cause operation of the drain pump after the evaporative cooler has operated for a period of time, an overflow pipe communicating with the exterior of the evaporative cooler and having an opening a predetermined distance above the bottom of the evaporative cooler to receive overflow water at substantially the height of said predetermined distance, and a drain pump output communicating between the drain pump and the exterior of the evaporative cooler.

25. The improvement according to claim 24, where the evaporative cooler has a primary pump, the timer being connected with the primary pump to turn on the drain pump based on the accumulated time of operation of the primary pump.

26. The improvement according to claim 25, wherein the timer has an electrical power input adapted for connection to an electrical input to the primary pump; whereby the timer is provided electrical power when the primary pump is provided electrical power.

27. The improvement according to claim 26, wherein the timer electrical power input is an electrical plug connector having an integrally formed electrical receptable.

28. The improvement according to claim 26, wherein the timer electrical power input is an electrical plug connector having an integrally formed electrical receptable.

29. The improvement according to claim 28, wherein the water flow path of the drain pump output has a plurality of spacers separating the overflow pipe from a drain conduit running from the drain pump, said spacers defining openings between the opening to the overflow pipe for receiving said overflow water.

30. The improvement according to claim 29, wherein the spacers are parts of an adapter connecting the overflow pipe and the conduit.

31. The improvement according to claim 30, wherein the adapter is formed separately from the overflow pipe.

32. The improvement according to claim 24, wherein the drain pump is operative to pump water down to a depth sufficiently low to substantially empty the evaporative cooler of standing water.

33. The improvement according to claim 32, wherein the drain pump is in draining communication with an entire water retaining location to which water drains in the cooler, whereby that entire location is drained by said drain pump to a low water level.

34. An evaporative cooler having an enclosure, an evaporative medium, a first pump having an output water path directed to wet the evaporative medium, a low level drain pump having an input in fluid communication with a location in the enclosure to which water drains from the evaporative medium, and an output communicating with the exterior of the enclosure, a timer connected to the low level drain pump to activate and activate the low level drain pump, the timer being responsive to the operation of the first pump to turn on the low level drain pump for a period of time sufficient to substantially drain the interior of the cooler each time the first pump has operated a predetermined number of hours, a water input, a float valve connected to the water input and having a float responsive to the draining of water from the interior of the enclosure by the low level drain pump to open the float valve and introduce fresh water into the enclosure for use in wetting the evaporative medium.

* * * * *